United States Patent [19]

Giebel et al.

[11] 4,237,335

[45] Dec. 2, 1980

[54] MULTIPLE JOINT BOX UTILIZING A THERMOPLASTIC CLAMPING SLEEVE PRINCIPLE

[75] Inventors: Wolfgang Giebel, Traubing; Herbert Krause, Munich; Hans-Juergen Meltsch, Germering, all of Fed. Rep. of Germany

[73] Assignee: Siemens Aktiengesellschaft, Berlin & Munich, Fed. Rep. of Germany

[21] Appl. No.: 927,358

[22] Filed: Jul. 24, 1978

[30] Foreign Application Priority Data

Aug. 10, 1977 [DE] Fed. Rep. of Germany ....... 2736039

[51] Int. Cl.³ .......................................... H02G 15/013
[52] U.S. Cl. ........................................ 174/92; 174/78; 174/93
[58] Field of Search ................... 174/92, 93, 91, 78, 174/77 R, 151

[56] References Cited

U.S. PATENT DOCUMENTS

| 2,454,838 | 11/1948 | Richardson et al. | 174/77 R X |
|---|---|---|---|
| 2,969,412 | 1/1961 | Frank | 174/151 |
| 3,395,382 | 7/1968 | Weagant | 174/91 X |
| 3,441,662 | 4/1969 | Augenstein et al. | 174/77 R X |
| 3,493,670 | 2/1970 | Broadbelt et al. | 174/77 R X |
| 3,705,950 | 12/1972 | Jirka et al. | 174/138 F |
| 4,002,818 | 1/1977 | Kunze | 174/21 R |
| 4,109,097 | 8/1978 | Berry | 174/78 X |
| 4,117,259 | 9/1978 | Giebez et al. | 174/92 |

FOREIGN PATENT DOCUMENTS

| 52435 | 12/1966 | Democratic Rep. of Germany | ...174/93 |
|---|---|---|---|
| 2050536 | 12/1971 | Fed. Rep. of Germany | . |
| 2235415 | 1/1974 | Fed. Rep. of Germany | . |
| 2249368 | 4/1974 | Fed. Rep. of Germany | 174/91 |
| 7423507 | 11/1974 | Fed. Rep. of Germany | . |
| 2515939 | 10/1976 | Fed. Rep. of Germany | 174/92 |
| 870957 | 4/1942 | France | 174/151 |
| 112289 | 12/1917 | United Kingdom | 174/151 |

Primary Examiner—B. A. Reynolds
Assistant Examiner—E. F. Borchelt
Attorney, Agent, or Firm—Hill, Van Santen, Steadman, Chiara & Simpson

[57] ABSTRACT

A multiple joint box or distribution sleeve having a tubular sleeve, which has a longitudinal slit with wedge-shaped sealing elements along the slit, and sealing members at both ends of the tubular sleeve characterized by each of the sealing members comprising a pair of rigid disks and at least one elastic circular plate interposed and clamped therebetween, the disks and plate each having a plurality of apertures aligned with each other to form cable inlets with the apertures of the elastic circular plate having a smaller diameter than the aperture of the rigid disks, and each of the disks being provided with a peripheral bevel coacting with each other to form a circular groove for receiving means for forming a peripheral seal.

4 Claims, 4 Drawing Figures

MULTIPLE JOINT BOX UTILIZING A THERMOPLASTIC CLAMPING SLEEVE PRINCIPLE

BACKGROUND OF THE INVENTION

1. Field of the Invention

The present invention is directed to a multiple joint box or distribution sleeve comprising a longitudinally slitted sleeve member having wedge-shaped sealing elements along the side of the slit and sealing members disposed at both ends of the sleeve member.

2. Prior Art

Lead sleeves are presently used for multiple joint boxes or distribution sleeves so that the sealing of the distribution cables proceeds with plug bushings or shrunk on hoses. In German Offenlegungsschrift No. 1,958,155, which corresponds to U.S. Pat. No. 3,705,950, a slip-over sleeve with sealing elements is disclosed. The sealing elements seal the interior space of the sleeve towards a cable jacket with the aid of lips. The lips are pressed against the cable jacket by means of elastic force of the material.

Cable end seals, which are resistant to compression, are described in German Offenlegungsschrift No. 2,235,415, which utilizes two highly elastic sealing plates as the sealing elements. Each of these sealing plates have a lead-in opening or aperture for cables which openings have a diameter somewhat smaller than the diameter of the cable which is to be inserted therethrough.

Longitudinal seals of distribution sleeves can be formed in a manner, which is as simple as possible, by using techniques in accordance with known thermoplastic clamping sleeves. Known seals are disclosed in German Utility Model No. 7,423,507 in which a tubular sleeve has the longitudinal slit, which exhibits beadings or flanges along side of the slit. The beadings or flanges may be provided with undercuts and have an acute angle so that clamping rails can be shoved or pushed onto the flanges to form a closure of the slit. The flanges per se are enlarged so that in the longitudinal direction, they form an acute angle on one side in order to facilitate pushing on of the clamping rails.

In U.S. Pat. No. 4,002,818, which is based on German Utility Model No. 7,425,454, sealing members having a lip-shape, which are particularly suitable for lateral seals of the cable sleeve are disclosed. Such sealing members are less suited in distributing side of a multiple joint box or distribution sleeve due to the many distributing cables involved.

SUMMARY OF THE INVENTION

The present invention is directed to providing a multiple joint box or distribution sleeve comprising a tubular sleeve with sealing elements along a longitudinal slit and whose seals on the distributing side are designed in such a way that they better correspond to the requirements of the multiple joint box or distribution sleeve in regard to cable insertion and their seals. In addition, the distribution sleeves require no pressure gas monitoring, may be employed in the ground, and may be used with cables having a low cable diameter tolerance.

To accomplish these tasks, the invention is directed to an improvement in a distribution sleeve comprising a tubular sleeve having a longitudinal slit with wedge-shaped sealing elements along the slit, and sealing members at both ends of the sleeve. The improvement comprises each of the sealing members comprising a pair of rigid disks and at least one elastic circular plate being interposed and clamped between the pair of rigid disks, said disks and plate each having a plurality of apertures aligned with each other to form cable inlets with the aperture of the elastic circular plate having a smaller diameter than the apertures of the rigid disks, and each of said disks being provided with a peripheral bevel coacting to form a circular groove for receiving means for forming a peripheral seal between the tubular sleeve and sealing member.

The essence of the invention is to provide a sealing member, which comprises two rigid disks between which elastic plates of various thicknesses can be inserted and pressed. However, the employment of a single elastic disk is also possible. As a utilization for multiple joint boxes and/or distribution sleeves, each sealing member is provided with several axially directed cable inlet apertures. The apertures of the rigid disks for each cable inlet exhibit a diameter which can be considered as the maximum diameter for the cable designated for insertion. However, the diameter of the aligned aperture of the elastic plates for each cable inlet, which plates are disposed between the rigid disks, are smaller than the minimum diameters of the cable designated for insertion so that in any case the elastic plate protrudes and adapts to the cable when the cables are inserted to form the seal. The material of the elastic plates, for example, neoprene, exhibits such an elasticity that the necessary sealing effect is obtained by the elastic sealing forces when a cable is inserted through the apertures of the plastic plates.

Advantageous results are obtained during assembly when two elastic plates, which have different thicknesses and diameters for their apertures, are used. The utilization of a sealing paste or compound offers an additional assembly advantage since the sealing paste has a lubricating effect when the distributing cables are being inserted or pushed through the aligned apertures which form the cable inlet and later the paste aids in supporting the sealing effect. Since the number of apertures provided for the respective type of cables is present from the beginning, the cable inlets not required may be sealed with blind or dummy plugs. After the assembly of the cables in a sealing member is completed, an already known simple tubular sleeve having a longitudinally extending slit is arranged about the sealing members. The tubular sleeve has wedge-shaped flanges along the slit and is closed by tapering clamping rails.

Elastic or permanent plastic sealing compound can be inserted between the sealing grooves formed by the beveled edges on the periphery of the rigid plates to complete the sealing between the sealing member and the tubular sleeve. However, the sealing means may be a peripheral portion of one or more of the elastic plates that are clamped between the pair of rigid plates.

DESCRIPTION OF THE PREFERRED EMBODIMENTS

Figure 1:
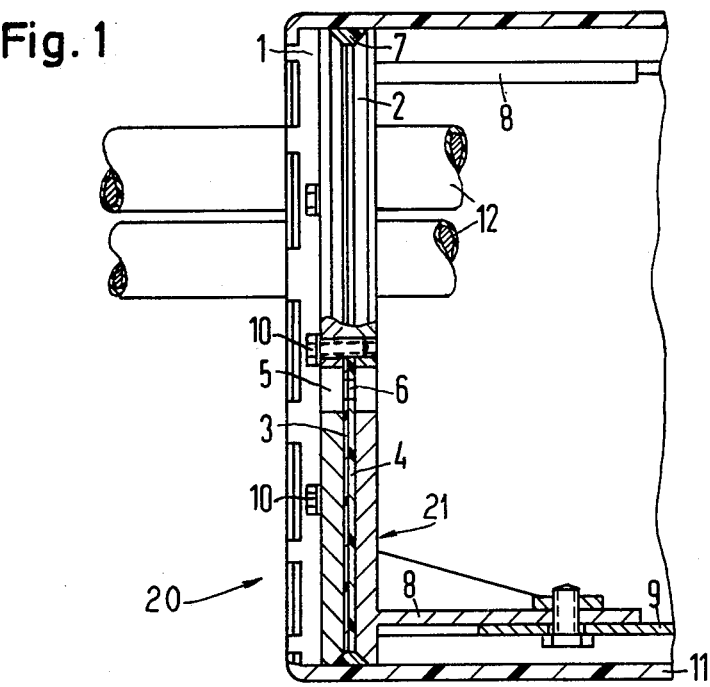
FIG. 1 is a partial cross-section with portions in elevation for purposes of illustration of the improved sealing member of the present invention.

The principles of the present invention are particularly useful in a distribution sleeve or multiple joint box generally indicated at 20 in the figures. The distribution sleeve 20 comprises a tubular sleeve member 11 having a longitudinal slit with wedge-shaped sealing elements 13 disposed therealong. The tubular sleeve member 11 at each end engages in a sealing relationship a sealing member or unit 21 which, as best illustrated in FIG. 1, comprises a pair of rigid disks or plates 1 and 2, which are provided with beveled peripheral edges. These peripheral edges coact to form a circular peripheral groove for receiving means for forming a peripheral seal such as sealing compound 7, which engages the inner surface of the sleeve 11.

The sealing member 21 includes at least one elastic plate. As illustrated, plates 3 and 4, which have different thicknesses, are interposed between the rigid plates 1 and 2 and clamped therebetween by the aid of screws 10, which form means for interconnecting the plates 1 and 2 together. Insomuch as the rigid disks 1 and 2 are conductive, a ground potential of the cable and of the distributing cables can be tapped at one or more of these screws 10 and can be connected to the frame support. A connection between the cable and the disk 2 is completed by connecting to an internal flange 8 of the disk 2. With non-conducting disks 1 and 2, a separate ground lead may be provided.

Moreover, as visible, the rigid disk 2, which has the internal flange 8, may be interconnected to the internal rigid disk of the other sealing member by means of rails 9. These rails 9 and flanges 8 form a traction relief for the assembly 20.

The sealing member 21 is mounted in such a way that the apertures 5 of the two rigid disks 1 and 2 as well as the apertures 6 of the elastic plates 3 and 4 come into coincidence and are aligned to form cable inlets. As illustrated, the diameters of the apertures 6 are substantially smaller than the diameter of the apertures 5. It is also noted that when a cable such as 12 is inserted, the elastic plates 3 and 4 at the apertures 6 will protrude or be stretched so that the material of the plastic plate adjacent the apertures is pressed on the cable jacket in a sealing manner.

Figure 2:
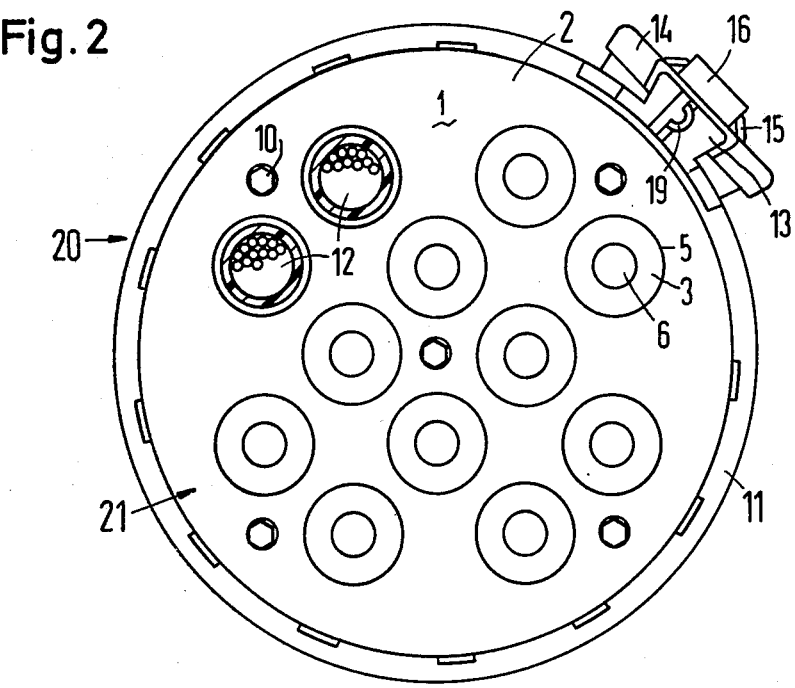
FIG. 2 is an end view with portions in cross-section for purposes of illustration of the distribution sleeve in accordance with the present invention.
Figure 3:
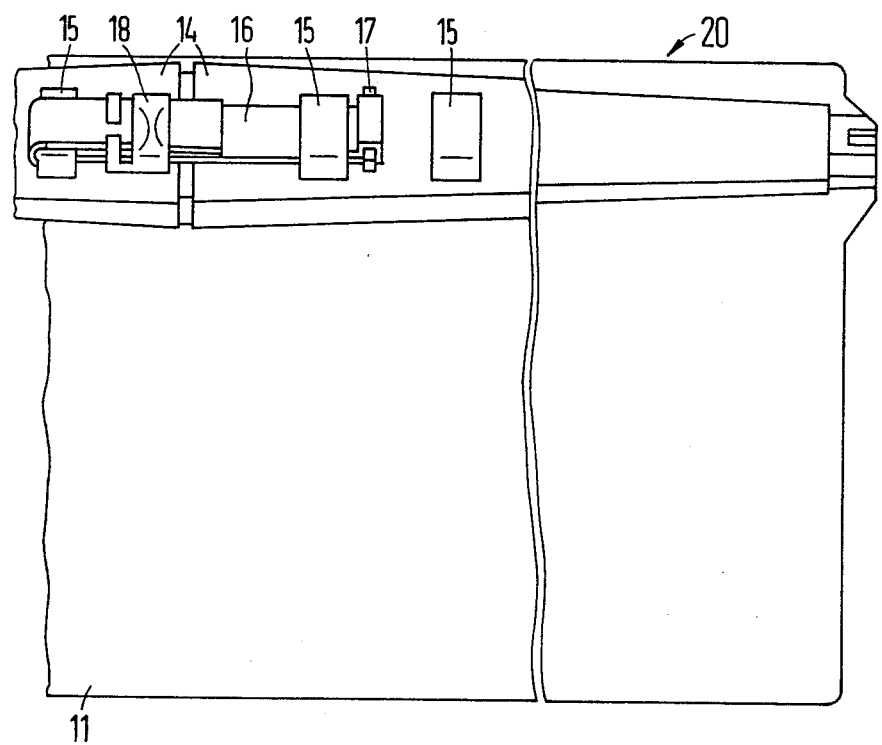
FIG. 3 is a partial side view of the device of FIG. 1 illustrating closing of the longitudinal slit.

As best illustrated in FIG. 2, the tubular sleeve 11 is pressed onto the sealing member 21 due to the force created by the wedge-shaped clamp rails 14 engaging the wedge-shaped flanges or beadings 13 and force them into sealing engagement. As illustrated, a sealing member 19 is interposed in a groove and projection provided on the surfaces of the flanges 13. In order to prevent the rails 14 from slipping off, the two rails are interconnected by a tension band or strap 16, which extends through loops or definitions 15 on each of the rails 14. As best illustrated in FIG. 3, the tension band 16 at one end is provided with a loop and a pin 17 to prevent slippage of the band through one of the definitions or loops 15 of the rail 14. The other end is bent around the definition 15 of the other rail and secured on the strap 16 by means of a tension lock 18.

As illustrated in FIG. 2, the apertures 5 in the rigid plates such as 1 and 2 have a substantially larger diameter than the apertures 6 in the plastic plates such as 3 and 4. The apertures 5 define the maximum size of the cable 12, which can be inserted through the sealing means 21 and the apertures 6 having a substantially smaller diameter than the minimum diameter of the cable such as 12. As illustrated, the sealing member is provided with a plurality of the cable inlets or aperture combinations such as twelve cable inlets. These cable inlets may be of different size or the same size as illustrated. If a cable inlet is not going to be provided with a cable such as 12, it can be closed and sealed by a blind plug or dummy plug. The dummy plug or blind plug is dimensioned so that it will not slide through the cable inlet during its insertion, it will form a seal which will withstand either a positive or negative pressure in the sleeve during its intended use, and a subsequent insertion of the distribution cable in the cable inlet closed by a dummy plug is always possible.

Figure 4:
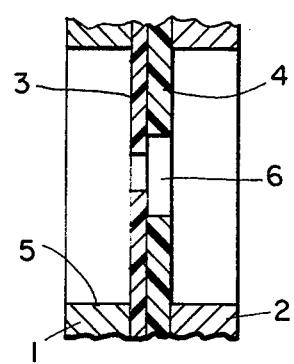
FIG. 4 is an enlarged partial cross sectional view illustrating the relationship of the elastic plate thicknesses and the aperture in the disks and plates.

As best illustrated in FIG. 4, the elastic plate 4 has a greater thickness than the plate 3. Also, the aperture in one of the elastic plates is smaller than the aperture of the other elastic plate.

In conclusion, it should be noted that any sealing member, which utilizes a pair of rigid plates clamped onto at least one plastic plate, is to a large degree independent of the particular structure or form of the sleeve member being utilized. In addition, since the sealing member is independent of the particular type of seal being utilized by the sleeve member, it may be employed with other types or embodiments of tubular sleeves and seals.

Although various minor modifications may be suggested by those versed in the art, it should be understood that we wish to embody within the scope of the patent warranted hereon, all such modifications as reasonably and properly come within the scope of our contribution to the art.

We claim:

1. A distribution sleeve which has a tubular sleeve having a longitudinal slit with wedge-shaped sealing elements along the slit and sealing members at both ends of the tubular sleeve, the improvements comprising each of the sealing members being a separate unit comprising a pair of rigid disks, at least two elastic circular plates, and means for interconnecting the disks together with the plates being interposed and clamped therebetween, each of said plates having a different thickness, said disks and plates each having a plurality of apertures aligned with each other to form a plurality of cable inlets with each of the apertures of the elastic circular plates of a cable inlet having a smaller diameter than the apertures of the rigid disks for the same inlet, the apertures in one of said elastic plates being smaller than the apertures in the other elastic plate, and each of said disks being provided with a peripheral bevel coacting to form a circular groove, and means for forming a peripheral seal between the sealing member and the tubular sleeve being received in said groove.

2. A distribution sleeve according to claim 1, wherein each pair of rigid disks includes an interior rigid disk having flanges extending into the interior of the tubular sleeve.

3. A distribution sleeve according to claim 2, wherein the means for interconnecting includes at least one connecting screw, wherein the sleeve includes an interior rail extending between and being connected to a flange of each interior disks, and wherein one of said connecting screws forms an external ground potential connection for the interior rail.

4. A distribution sleeve according to claim 1, wherein dummy plugs are inserted in each of the cable inlets not being utilized to receive cables.

* * * * *